United States Patent
Chuan

(10) Patent No.: US 7,752,712 B2
(45) Date of Patent: Jul. 13, 2010

(54) HINGE

(75) Inventor: Chih-Kuang Chuan, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 377 days.

(21) Appl. No.: 12/009,803

(22) Filed: Jan. 21, 2008

(65) Prior Publication Data

US 2009/0183341 A1  Jul. 23, 2009

(51) Int. Cl.
*E05D 11/06* (2006.01)

(52) U.S. Cl. .............................. 16/358; 16/361; 16/239

(58) Field of Classification Search ................. 16/358, 16/359, 360, 361, 239, 242; 455/575.4; 379/433.01, 379/433.12, 433.13; 361/679.05, 679.27, 361/679.13, 679.56
See application file for complete search history.

(56) References Cited

U.S. PATENT DOCUMENTS 6,493,906 B2 * 12/2002 Matteau ...................... 16/358

| 7,529,571 | B2 * | 5/2009 | Byun et al. ............... 455/575.4 |
| 7,546,150 | B2 * | 6/2009 | Makino .................... 455/575.1 |
| 2006/0223596 | A1 * | 10/2006 | Hur .......................... 455/575.4 |
| 2008/0064452 | A1 * | 3/2008 | Kim et al. ................ 455/575.3 |
| 2008/0096619 | A1 * | 4/2008 | Kuga et al. ............... 455/575.4 |
| 2008/0242380 | A1 * | 10/2008 | Kajihara et al. .......... 455/575.4 |
| 2009/0049646 | A1 * | 2/2009 | Rubin et al. ................... 16/319 |
| 2009/0126158 | A1 * | 5/2009 | Jian ............................ 16/387 |

FOREIGN PATENT DOCUMENTS

JP    2006211576 A  *  8/2006

\* cited by examiner

*Primary Examiner*—Chuck Y. Mah
(74) *Attorney, Agent, or Firm*—William E. Pelton, Esq.; Cooper & Dunham LLP

(57) ABSTRACT

A hinge is mounted between a base and a screen of an electrical device and has a base panel, a guiding panel and a connecting member. The base panel is attached to the base and has a front surface. The guiding panel is mounted slidably on the front surface of the base panel and has a front surface and an arced slot. The connecting member is mounted slidably on the front surface of the guiding panel, is mounted securely on the screen panel and slides along the arced slot when in operation to allow users to slide and rotate the screen relative to the base.

7 Claims, 5 Drawing Sheets

HINGE

BACKGROUND OF THE INVENTION

1. Field of the Invention

The present invention relates to a hinge, and more particularly to a hinge being mounted between a screen and a base of an electrical device to allow the screen rotate relative to the base.

2. Description of the Prior Arts

Some modern electrical devices such as touch-screen computers, cell phones, PDAs (personal digital assistant), and the like have a screen, a base and a conventional hinge. The conventional hinge is mounted between the screen and the base to allow the screen to slide relative to the base as an opening and closing device and may selectively reveal buttons, a camera lens or other such ancillary feature.

However, the conventional hinge provides a direct sliding function and this limits orientations and layouts of functions.

To overcome the shortcomings, the present invention provides a hinge to mitigate or obviate the aforementioned problems.

SUMMARY OF THE INVENTION

The primary objective of the present invention is to provide a hinge to allow a screen of an electrical device rotate relative to a base.

A hinge is mounted between the base and the screen of the electrical device and has a base panel, a guiding panel and a connecting member. The base panel is attached to the base and has a front surface. The guiding panel is mounted slidably on the front surface of the base panel and has a front surface and an arced slot. The connecting member is mounted slidably on the front surface of the guiding panel, is mounted securely on the screen panel and slides along the arced slot when in operation to allow the screen to rotate relative to the base.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
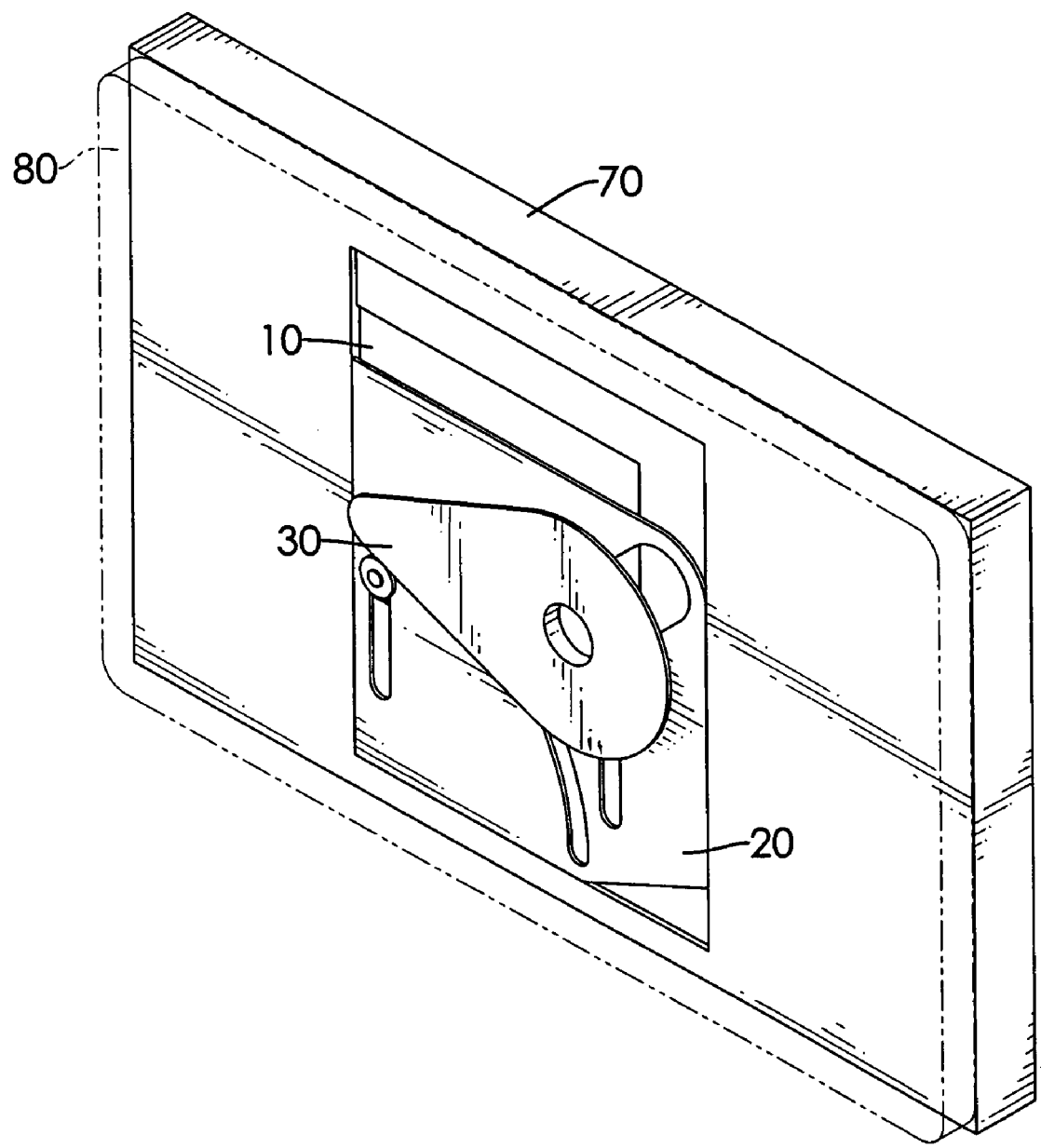
FIG. 1 is a perspective view of a hinge in accordance with the present invention mounted in an electrical device, the electrical device partially shown in phantom lines.
Figure 2:
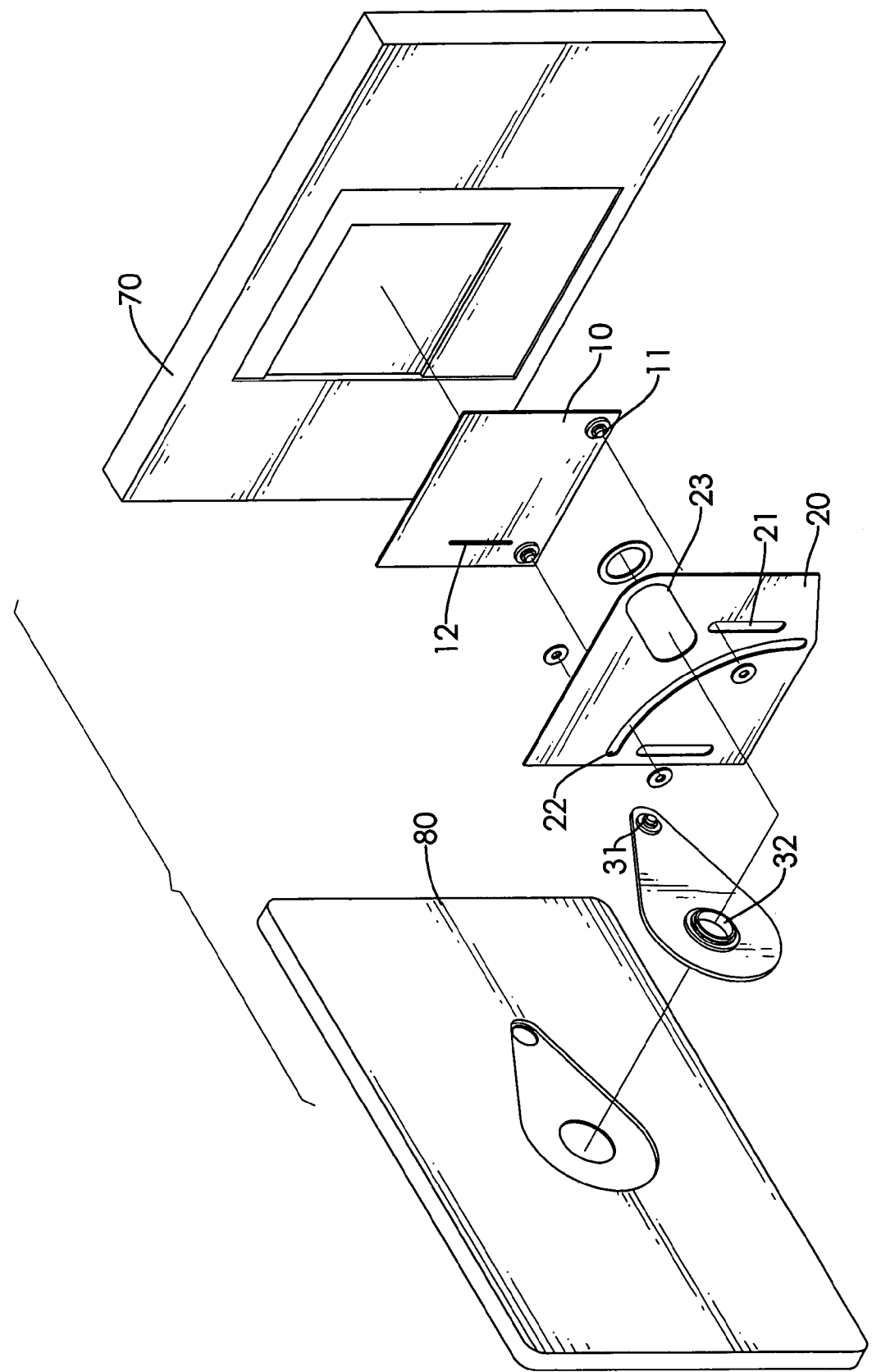
FIG. 2 is an exploded perspective view of the hinge in FIG. 1 and the electrical device.

With reference to FIGS. 1 and 2, a hinge in accordance with the present invention is mounted between a base (70) and a screen (80) of an electrical device and comprises a base panel (10), a guiding panel (20) and a connecting member (30).

The base panel (10) is attached to the base (70) and has a front surface, two slide edges, an end edge, two guiding protrusions (11) and an optional stopping rib (12).

The guiding protrusions (11) are attached to and protrude from the front surface of the base panel (10) respectively adjacent to the slide edges and may be disposed adjacent to the end edge.

The stopping rib (12) is formed on the front surface of the base panel (10), is parallel with the slide edges and is disposed near one of the slide edges.

Figure 3:
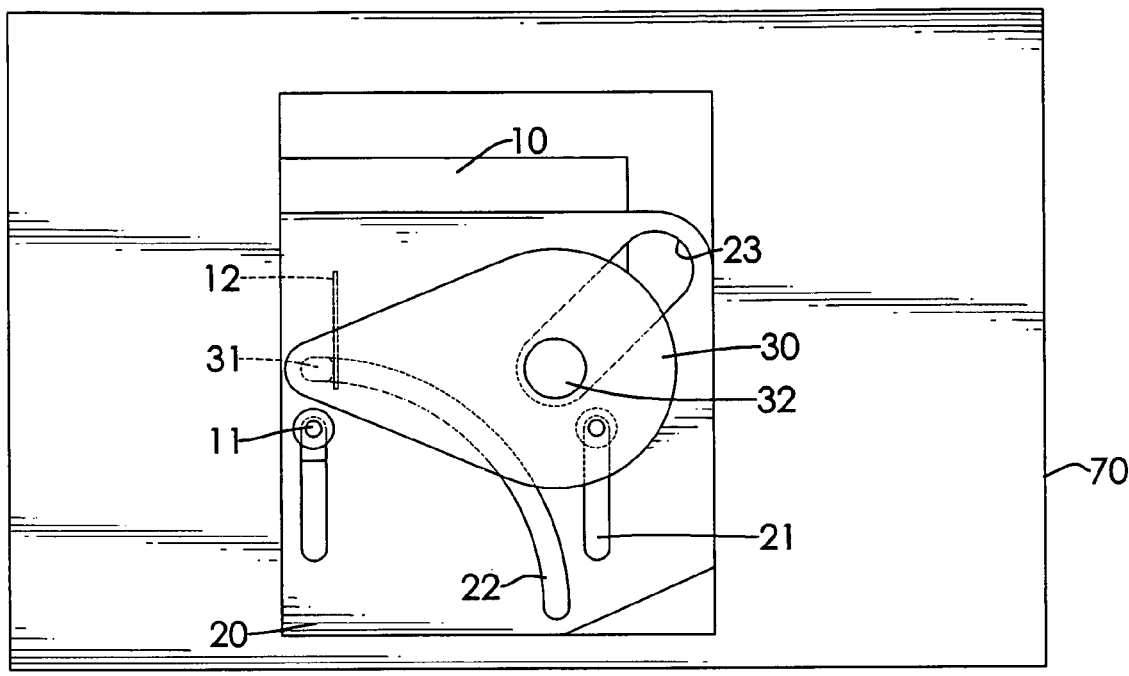
FIG. 3 is a front view of the hinge in FIG. 1 mounted in the electrical device.

With further reference to FIG. 3, the guiding panel (20) is mounted slidably on the front surface of the base panel (10) and has a front surface, two elongated slots (21), an arced slot (22) and a pivoting slot (23).

The elongated slots (21) are formed through the guiding panel (20), are parallel with the slide edges of the base panel (10), are respectively mounted slidably on the guiding protrusions (11) to allow the guiding panel (20) to slides relative to the base panel (10).

The arced slot (22) is formed through the guiding panel (20), may be a quarter arc of a circle and has a start end and a middle. The start end of the arced slot (22) corresponds to one of the side edges of the base panel (10) and may selectively cross the stopping rib (12). The pivoting slot (23) is formed through the guiding panel (20), is elongated, points toward and is perpendicular to a tangent of the middle of the arced slot (22).

The connecting member (30) is mounted slidably on the front surface of the guiding panel (20), is attached securely to the screen (80) to mount the screen (80) slidably on the base (70) and has two ends, a front surface, a rear surface, a sliding protrusion (31) and a pivoting protrusion (32).

The front surface of the connecting member (30) is attached securely to the screen (80).

The sliding protrusion (31) is attached to and protrudes from the rear surface of the connecting member (30) at one end, is mounted slidably through the arced slot (22) of the guiding panel (20) and may be selectively held in the start end of the arced slot (22) by the stopping rib (12).

The pivoting protrusion (32) is attached to and protrudes from the rear surface of the connecting member (30) at the other end, is mounted slidably through the pivoting slot (23) and slides along the pivoting slot (23) to allow the sliding protrusion (31) to slide along the arced slot (22).

Figure 4:
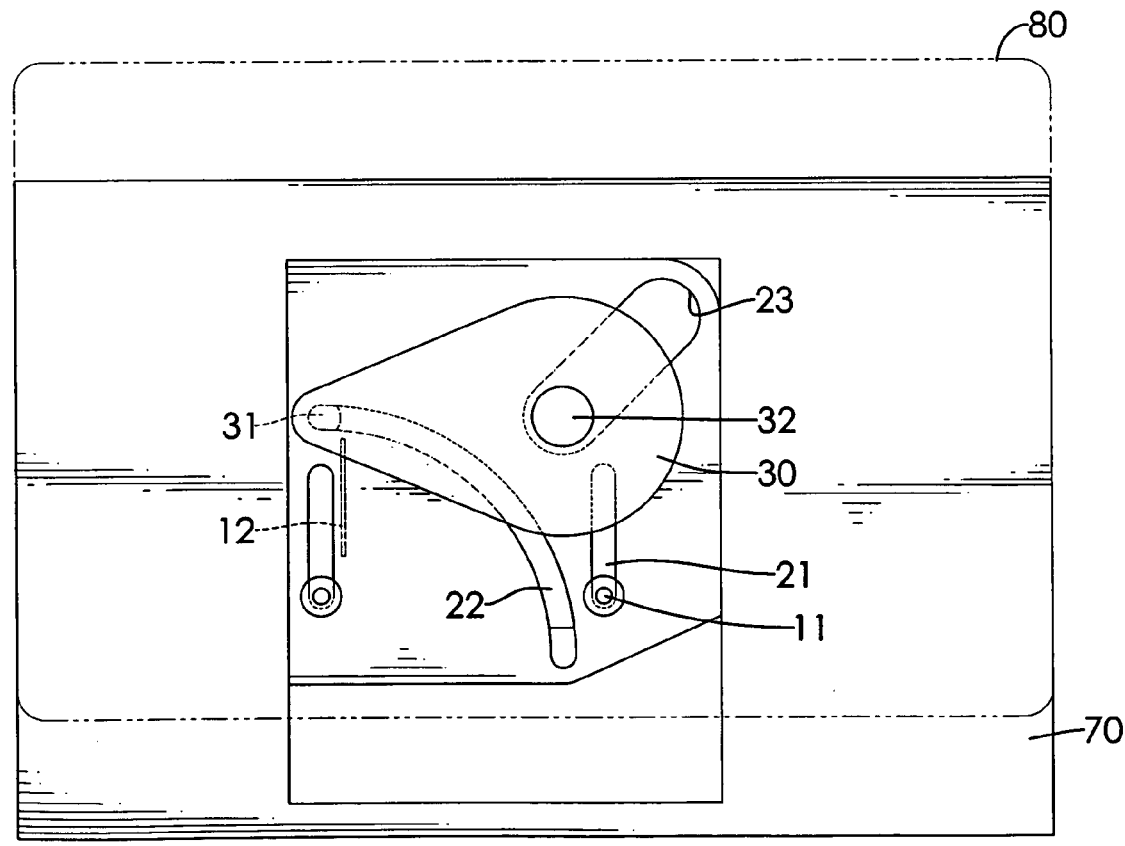
FIGS. 4 to 6 are operational front views of the hinge in FIG. 3 mounted in the electrical device showing sliding and rotation of the hinge.
Figure 5:
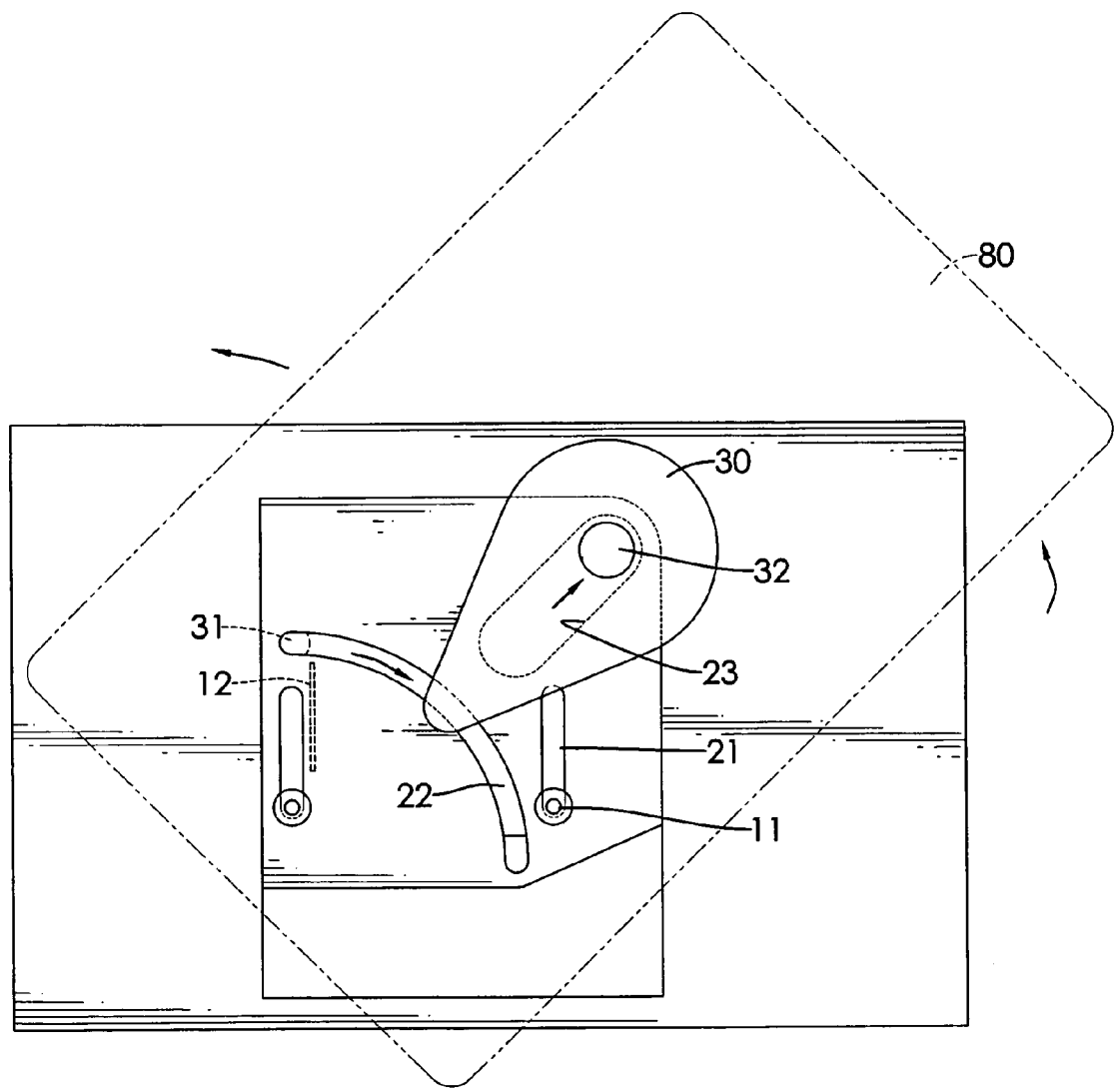
Figure 6:
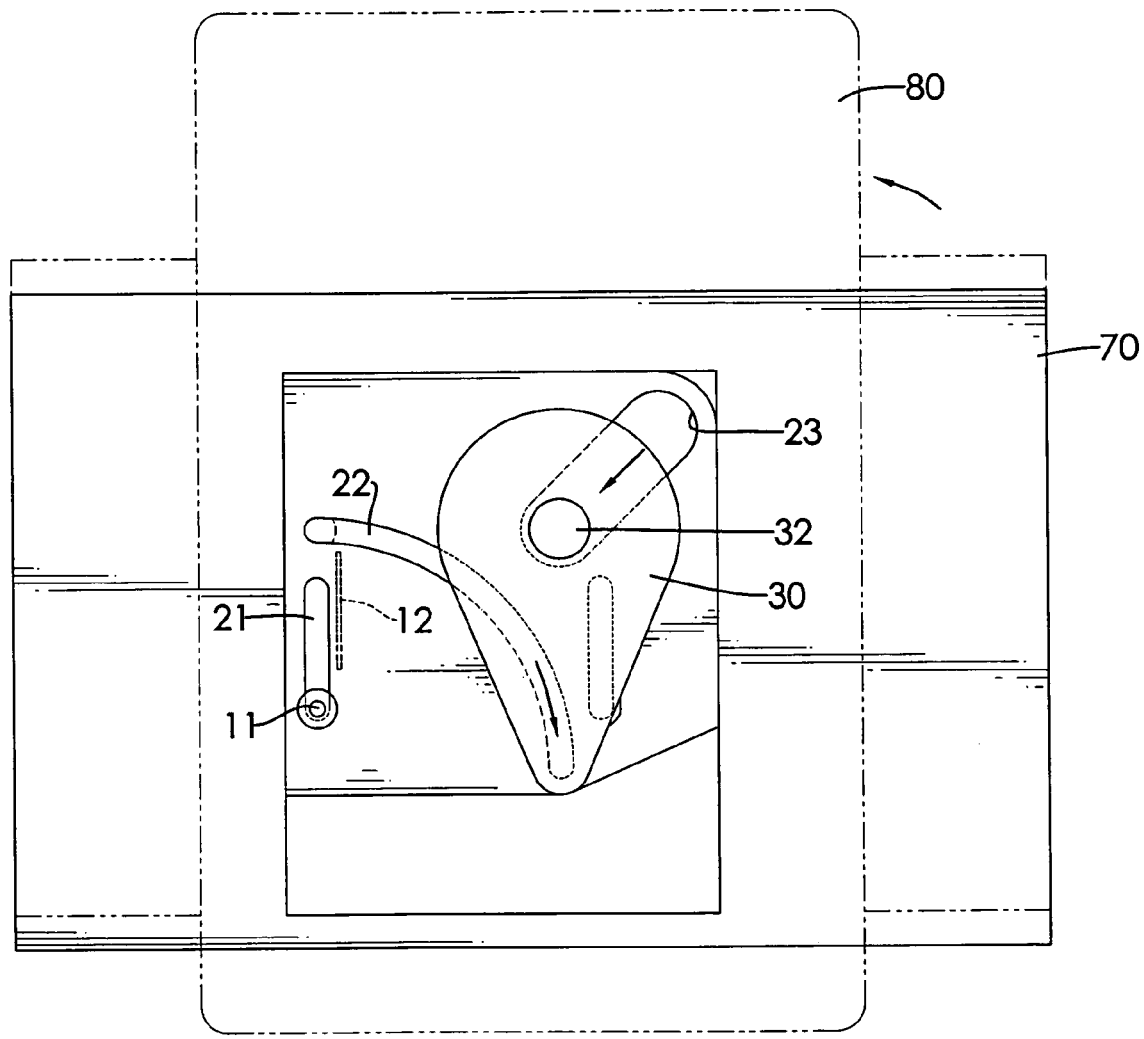

When in operation, the screen (80) can be slid parallelly relative to the base (70) to unlock the sliding protrusion (31) of the connecting member (30) from being held by the stopping rib (12), as shown in FIG. 4, and then the screen panel (80) can be slide along the arced slot (22), and rotated along and in the pivoting slot (23) as shown in FIGS. 5 and 6, to rotate the screen (80) into a perpendicular position.

Therefore, a range of orientations for ancillary devices such as buttons, camera lenses and the like can be arranged for improved user comfort.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge comprising
   a base panel having
      a front surface;
      two slide edges;
      an end edge; and two guiding protrusions being attached to and protruding from the front surface of the base panel respectively adjacent to the slide edges;

a guiding panel being mounted slidably on the front surface of the base panel and having a front surface;

two elongated slots being formed through the guiding panel, being parallel with the slide edges of the base panel, being respectively mounted slidably on the guiding protrusions;

an arced slot being formed through the guiding panel and having a start end corresponding to one of the side edges of the base panel; and a middle; and a pivoting slot being formed through the guiding panel, being elongated, pointing toward and being perpendicular a tangent of the middle of the arced slot; and a connecting member being mounted slidably on the front surface of the guiding panel and having two ends;

a rear surface;

a sliding protrusion being attached to and protruding from the rear surface of the connecting member at one end and being mounted slidably through the arced slot of the guiding panel; and a pivoting protrusion being attached to and protruding from the rear surface of the connecting member at the other end and being mounted slidably through the pivoting slot.

2. The hinge as claimed in claim 1, wherein the base panel further has a stopping rib being formed on the front surface of the base panel, being parallel with the slide edges and being disposed near one of the slide edges corresponding to the start end of the arced slot;

the start end of the arced slot selectively crosses the stopping rib; and the sliding protrusion of the connecting member is selectively held in the start end of the arced slot by the stopping rib.

3. The hinge as claimed in claim 2, wherein the arced slot is a quarter arc of a circle.

4. The hinge as claimed in claim 2, wherein the guiding protrusions of the base panel are disposed near the end edge of the base panel.

5. The hinge as claimed in claim 3, wherein the guiding protrusions of the base panel are disposed near the end edge of the base panel.

6. The hinge as claimed in claim 1, wherein the arced slot is a quarter arc of a circle.

7. The hinge as claimed in claim 1, wherein the guiding protrusions of the base panel are disposed near the end edge of the base panel.

* * * * *